(12) United States Patent
Klusacek

(10) Patent No.: US 9,581,169 B2
(45) Date of Patent: Feb. 28, 2017

(54) GAS-DYNAMIC AIR BEARING

(71) Applicant: Bosch Mahle Turbo Systems GmbH & Co. KG, Stuttgart (DE)

(72) Inventor: Michal Klusacek, Prague (CZ)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 78 days.

(21) Appl. No.: 14/542,104

(22) Filed: Nov. 14, 2014

(65) Prior Publication Data
US 2015/0139573 A1    May 21, 2015

(30) Foreign Application Priority Data

Nov. 15, 2013    (DE) ......................... 10 2013 223 329

(51) Int. Cl.
| | |
|---|---|
| F16C 32/06 | (2006.01) |
| F04D 29/057 | (2006.01) |
| F16C 17/03 | (2006.01) |
| F16C 25/02 | (2006.01) |
| F16C 27/02 | (2006.01) |
| F16C 33/10 | (2006.01) |

(52) U.S. Cl.
CPC .............. *F04D 29/057* (2013.01); *F16C 17/03* (2013.01); *F16C 25/02* (2013.01); *F16C 27/02* (2013.01); *F16C 33/1005* (2013.01)

(58) Field of Classification Search
CPC ......... F04D 29/057; F16C 17/02; F16C 17/03; F16C 17/035; F16C 27/02; F16C 32/0666; F16C 32/067; F16C 32/0677; F16C 32/0685; F16C 32/0688; F16C 25/02
USPC ................ 384/114, 117, 118, 119, 247, 263, 309,384/312, 316
See application file for complete search history.

(56) References Cited

U.S. PATENT DOCUMENTS

| | | | | |
|---|---|---|---|---|
| 2,538,746 A | * | 1/1951 | Dall ........................ | F16C 17/03 384/117 |
| 3,337,276 A | | 8/1967 | Cherubim | |
| 4,580,911 A | * | 4/1986 | Burkhard ................ | F16C 17/03 384/309 |
| 4,643,592 A | * | 2/1987 | Lewis ..................... | F16C 17/03 384/100 |

(Continued)

FOREIGN PATENT DOCUMENTS

CZ          2003-3062  A3    6/2005

OTHER PUBLICATIONS

English abstract for CZ-2003-3062.

*Primary Examiner* — James Pilkington
(74) *Attorney, Agent, or Firm* — Fishman Stewart PLLC

(57) ABSTRACT

A gas-dynamic air bearing for radially mounting a shaft may include a plurality of bearing segments arranged in a recess of a housing. The bearing segments may radially enclose the shaft. Each bearing segment may be held with play on the housing via a respective bolt arranged radially to a predetermined bearing axis. Each bearing segment may include an associated stop spring device supported between the housing and the bearing segments. The respective stop spring device may be resilient to stroke movements of the bearing segment effective radially outwardly relative to the bearing axis. The respective bolts may be adjustably screwed to the housing. The bolts may have an end on a segment side that delimits a spring travel of the stop spring device radially inwardly towards the bearing axis and may position the respective bearing segment.

20 Claims, 2 Drawing Sheets

(56) References Cited

U.S. PATENT DOCUMENTS 4,815,865 A * 3/1989 Gerling .................. F16C 17/03
                                                     384/117
7,611,286 B2   11/2009 Swann et al.

\* cited by examiner

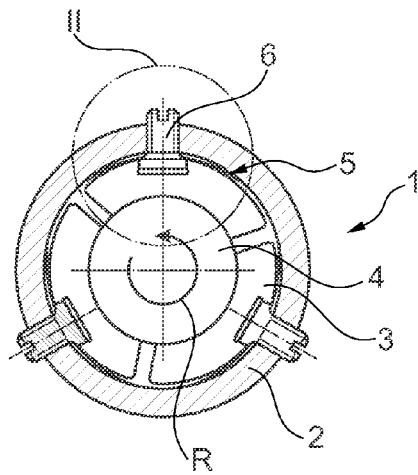
Fig. 1
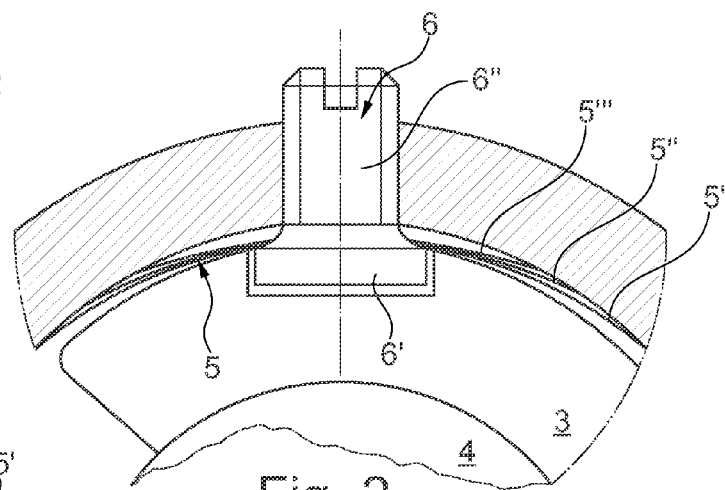
Fig. 2
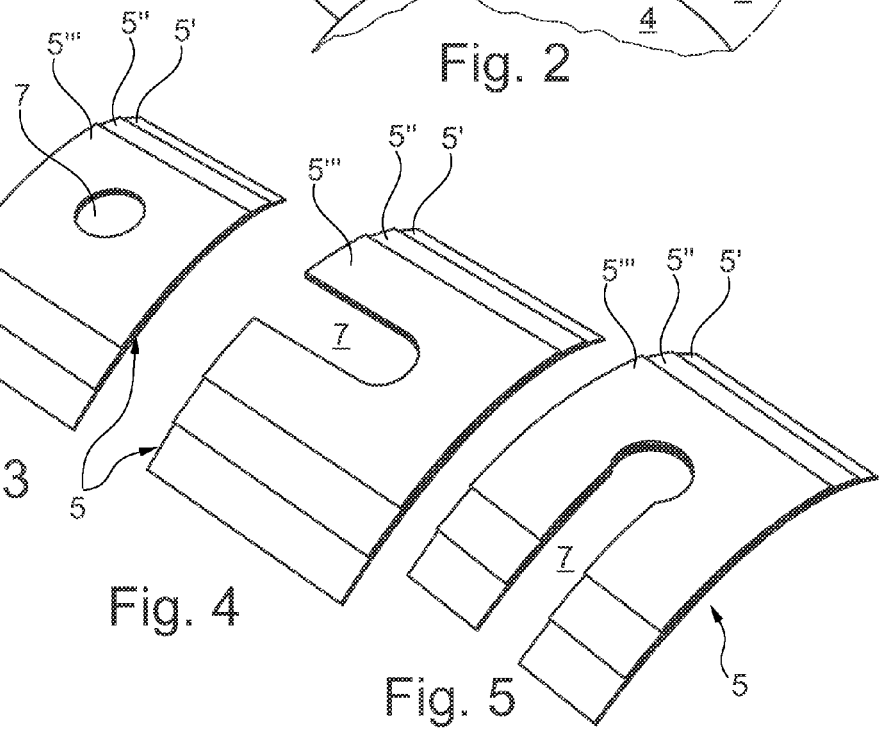
Fig. 3
Fig. 4
Fig. 5

GAS-DYNAMIC AIR BEARING

CROSS REFERENCE TO RELATED APPLICATIONS

This application claims priority to German Patent Application No. 10 2013 223 329.9, filed Nov. 15, 2013, the contents of which are hereby incorporated by reference in their entirety.

TECHNICAL FIELD

The invention relates to gas-dynamic air bearings for the radial mounting of a shaft, in particular the rotor shaft of a turbocharger.

BACKGROUND

Such an air bearing is the subject of CZ 2003 3062 A. In this known air bearing, a bolt, which is radial with respect to the bearing axis, is adjustably screwed on the outside into each bearing segment, which bolt is arranged axially displaceably with a smooth shank region in a radial bore of a bearing housing. The possible axial displacement path is delimited on the one hand by a collar arranged on the bolt, which is provided between the bearing segment and the facing inside of the bearing housing, and on the other side by an adjustable nut, which is adjustably screwed onto a threaded portion on the segment-distal end of the pin and interacts with a stop surface on the housing outside. Between the collar and the inside of the bearing housing, a stop spring device designed as a leaf spring is arranged or clamped in.

Disadvantageous in this solution is the adjustable screwing of the bolt to the bearing segment. This is only suitable for bearing segments with a greater thickness so that the bolt can be accommodated in the bearing segment. A further disadvantage is the loose connection of the bolt with the bearing housing. Upon a radial movement of the bearing segment, the bolt moves in the radial bore of the housing which leads to the wear of the bolt and/or of the housing bore. This wear in turn leads to a greater play between the bolt and the bearing housing so that the desired positioning of the segment through the bolt is no longer attainable.

SUMMARY

The object of the invention therefore is to create a suitably improved air bearing.

This object is solved through the features of the present disclosure.

The invention is based on the general idea of positioning the bearing segments on housing-fixed bolts and through screw adjustability of the bolts on the housing adjust the minimum spacing of the stop spring device from the bearing axis.

In this connection it is provided according to a particularly preferred embodiment of the invention that the bearing segments between the circumference of the shaft and the stop spring device have a predetermined, adjustable play in radial direction of the bearing axis when the axis of the shaft coincides with the predetermined bearing axis.

Thus, upon rotation of the shaft, a supporting air gap materialises between the bearing segments and the shaft circumference within an extremely short start-up phase, the mean width of which is initially determined by the dimension of the play, which is available to the bearing segments in radial direction of the bearing axis between the shaft circumference and the respective stop spring device. The resilience of the stop spring device thus becomes only effective with the invention when the shaft applies greater loads onto the air cushion in the air gap mounting the shaft because of external interference forces or when an air cushion with greater thickness is formed at very high rotational speeds.

According to a further preferred embodiment of the invention it can be provided that the curvature radius of the side of each bearing segment facing the shaft is slightly larger than the radius of the shaft circumference. Because of this, the gas-dynamic structure of the air cushion mounting the shaft between the segments and the shaft circumference is favoured.

In this connection it is particularly advantageous that the bearing segments are held with play on the bolt on the housing side so that the bearing segments can each assume a position that is optimal for the developing air cushions upon rotation of the shaft. There is in particular the possibility that the air gap between bearing segment and shaft on the end of the respective bearing segment that is opposite to the direction of rotation of the shaft can have a greater width than on the other end of the bearing segment facing in the direction of rotation of the shaft, i.e. the width of the air gap tapers in direction of rotation.

Otherwise, with respect to preferred features of the invention, reference is made to the claims and the following explanation of the drawing, with the help of which particularly preferred embodiments of the invention are described in more detail.

It is to be understood that the shown features cannot only be substantial to the invention within the respective feature combination stated but also by themselves.

BRIEF DESCRIPTION OF THE DRAWINGS

In the drawing it shows

FIG. 1 a radial section of an air bearing according to the invention,

FIG. 2 an enlarged representation of the detail II in FIG. 1,

FIG. 3 a first embodiment of a stop spring device designed as a leaf spring, FIG. 4 a second embodiment of the stop spring device, FIG. 5 a third embodiment of the stop spring device, FIG. 6 a further embodiment of the air bearing with particularly designed bolt, FIG. 7 a modification of the embodiment according to FIG. 6.

DETAILED DESCRIPTION

Figure 6:
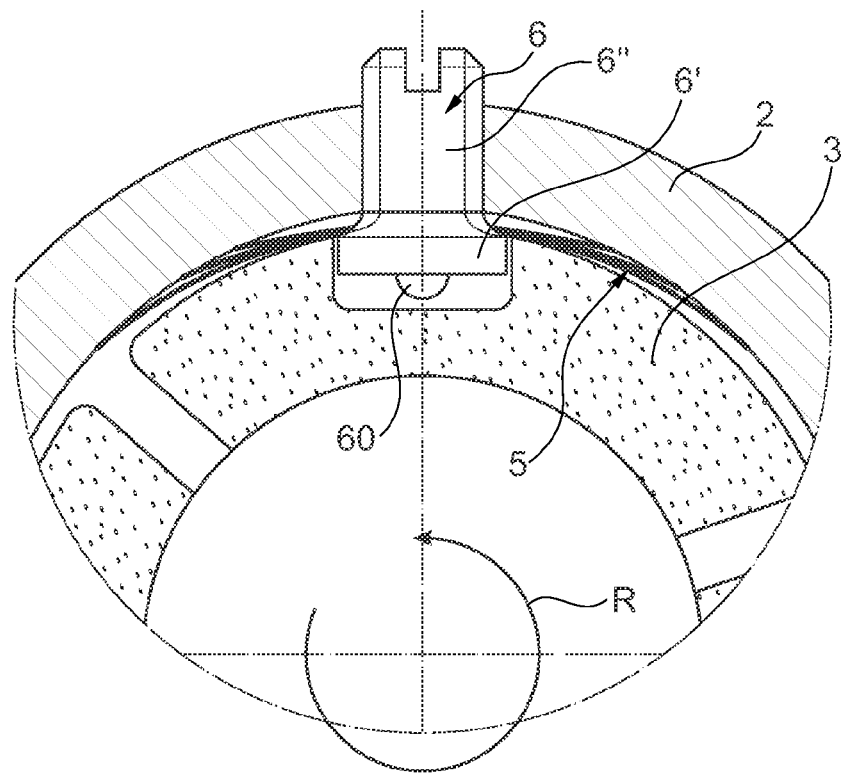

According to FIG. 1, the air bearing 1 comprises a bearing housing 2 with an in particular circular recess, within which at least three bearing segments 3 are arranged, which jointly enclose and mount a shaft 4. Between the inner circumference of the recess of the bearing housing 2 and the facing outside of each bearing segment 3, a stop spring device in the form of a leaf spring 5 is arranged, which with its longitudinal ends is tensioned against the inner circumference of the recess in the bearing housing 2 and with its middle region in the direction of the facing outside of the respective bearing 3. The bearing segments 3 are held fixed in direction of a bearing axis that is perpendicular to the drawing plane or in the axial direction of the central axis of the recess of the bearing housing 2 and in circumferential direction of the shaft 4 through bolts 6, which with a head part 6' each project into a recess on the outside of the respective bearing segment 3 and with a worm screw-like shank 6" are screw-adjustably turned into a corresponding threaded bore of the bearing housing 2. The shank 6" of each bolt 6 penetrates a recess 7 of the leaf spring 5 (see also FIG. 3-5) with a preferentially threadless portion, wherein the edge of the recess 7 is overlapped by a radial annular step formed on the transition between head part 6' and shank 6" of the bolt on the side of the leaf spring 5 facing the respective bearing segment 3. Accordingly, the maximum deflection stroke of the middle region of the leaf spring 5 near the bolt in the direction of the shaft 4 can be limited through screw adjustment of the bolt 6.

Preferentially, the deflection stroke of the leaf spring 5 is limited through screw adjustment of the bolt 6 in such a manner that the respective bearing segment 3 between the circumference of the shaft 4 and the leaf spring 5 contacting the annular step of the bolt 6 has a small radial play when the shaft 4 assumes a position in which the axis of the shaft 4 coincides with the aforementioned bearing axis.

At the same time, the curvature radius of the concave side of each bearing segment 3 enclosing the shaft 4 is dimensioned slightly larger than the radius of the circumference of the shaft 4, wherein the difference in size preferentially corresponds approximately to the dimension of the aforementioned play of the bearing segment 3 between the shaft and the leaf spring 5. Otherwise, each bearing segment 3 is mounted on the associated bolt 6 with play in circumferential direction, axial direction and radial direction of the shaft 4 as well as in a wobble-moveable manner.

During the rotation of the shaft 4 a supporting air gap forms between the shaft circumference and the bearing segments 3, the formation of which on the one hand is favoured through the different radii of the shaft circumference and the concave side of the bearing segment 3 and on the other hand is favoured in that the bearing segments between the associated leaf springs 5 and the shaft circumference have a certain radial play when the axis of the shaft 4 coincides with the aforementioned bearing axis. Apart from this, forming the supporting air gap can be favoured in that the end of each bearing segment 3 facing against the direction of rotation R, based on the recess receiving the bolt 6 on the respective bearing segment 3 is longer in circumferential direction of the shaft than the other end facing in the direction of rotation R.

The air gap formed during the operation regularly has a slightly larger width on the end of a bearing segment 3 facing against the direction of rotation R than on the other end of the bearing segment 3. Otherwise, the respective bearing segment 3 can assume a position that is optimal for the respective operating conditions because of the mounting with play on the respective bolt 6 in axial and circumferential direction of the shaft 4.

Here it is emphasised that during the operation a two-line contact between the leaf spring 5 and the respective bearing segment on lines that are parallel to the axis of the shaft 4 occurs closely next to the respective bolt 6, i.e. the leaf spring 5 has a correspondingly formed curvature or is correspondingly curved through the respective bolt 6. Per se, a one-line contact each between leaf spring and bearing segment had been considered desirable up to now but the two-line contact has surprisingly proved to be advantageous. This could be due to the fact that through position changes of the bearing segment 3 brought about by external interference forces are effectively dampened through the friction connected with a two-line contact without the bearing segments being prevented from assuming their position that is optimal for the air mounting of the shaft 4 subject to utilising their play on the bolts 6.

For the movability of the bearing segments on the bolts 6 it is advantageous among other things that the head parts 6' of the bolts 6 only have a minor axial length and accordingly project comparatively little into the associated recess of the respective bearing segment 3. Since the diameter of the head part 6' is preferentially slightly smaller than the inner diameter of the recess received in the respective bearing segment 3 receiving the respective head part 6', the bearing segments have the movability already mentioned above in such a manner that they can follow dynamic fluctuations of the air in the air gap between the circumference of the shaft and the bearing segments 3. The wobbling movements that occur in the process, like the stroke movements of the bearing segments 3 that occur in axial direction of the bolt 6 and movements that occur in axial direction of the shaft 4 are dampened through the respective leaf spring 5. Thus, the leaf spring 5 on the one hand ensures the desirable movability of the associated bearing segment 3 and on the other hand the damping of these movements.

According to FIGS. 3 to 5, the leaf springs 5 can each have multiple leaves 5' to 5'''. Here it is preferentially provided that the leaves 5' to 5''' are substantially flat in the dismantled state of the air bearing 1 and are tensioned into their arc-like curved shape only upon the assembly of the air bearing. Accordingly, the longitudinal ends of the respective leaf spring support themselves on the inner circumference of the recess of the bearing housing 1 while the middle region of the leaf spring 5 near the bolt is tensioned against the facing outside of the bearing segments 3 or the facing annular step at the transition between a part 6' and shank 6" of the bolts 6. During spring strokes, the longitudinal ends of the leaf springs perform minor displacement movements on the inner circumference of the recess of the bearing housing 2, apart from this, the leaves 5 to 5''' shift slightly relative to one another so that the friction connected with this has a damping effect. Through the number of the leaves and their length the damping effect can be influenced. Otherwise, the damping action is also influenced through the arc shape of the leaf springs, since the respective arc shape defines the position of the contact zones between the leaf spring 5 and the associated bearing segment 3.

According to FIGS. 3 to 5, the recess 7 that is penetrated by the shank 6" of the respective bolt 6 can have different shapes. According to FIG. 3, the recess 7 can form a circular aperture, wherein the dimension of the diameter of the aperture defines the position of the contact zones between leaf spring and head of the respective bolt 6.

According to FIG. 4, the recess 7 can be designed open in the direction of a longitudinal edge of the leaf spring 5.

According to FIG. 5, a design that is open in longitudinal direction of the respective leaf spring 5 is also possible.

In the embodiments according to FIGS. 4 and 5, the recess 7 can preferentially have a keyhole-like profile in such a manner that the shank 6" of the bolt 6 interacts with the recess 7 in a positively joined manner and the position of the leaf spring 5 relative to the respective bolt 6 is locked in a positively joined manner.

The distribution of the spring forces of the leaf spring 5 is also influenced through the shape of the recess 7. Accordingly, the spring forces on the longitudinal edges of the leaf spring in the example of FIG. 4 differ, which means that on the longitudinal edge of the leaf spring assigned to the open side of the recess 7 there are other spring forces than on the opposite longitudinal edge.

In the example of FIG. 5, the tongue-shaped ends of the leaf spring 5 on both sides of the aperture of the recess 7 are comparatively soft compared with the in FIG. 5 rear leaf spring regions.

In the invention it is advantageous that simple adjustment of the starting positions of the bearing segments 3 is made possible. During the production of the air bearing, the bolts 6 can be turned into the associated threaded bores of the housing 1 more or less far so that the regions of the leaf spring 5 near the bolt and thus the associated bearing segment 3 can assume an end position that comes close to the shaft 4 to a greater or lesser degree.

In the embodiments shown in FIGS. 1 and 2, the opposite end position of the leaf spring 5 and of the respective bearing segment 3 is achieved when the leaf spring 5 is areally pressed against the inner circumference of the recess of the housing 1. If appropriate, it is also possible according to FIGS. 6 and 7, to provide a preferentially crowned stop 60 on the face end of the bolts 6 facing the receptive bearing segment 3, which delimits the possible path of the respective bearing segment 3 radially outwardly before the bearing segment 3 can press the associated leaf spring 5 areally against the recess of the housing 1. According to FIG. 6, this stop 60 can be permanently moulded onto the bolt 6.

Figure 7:
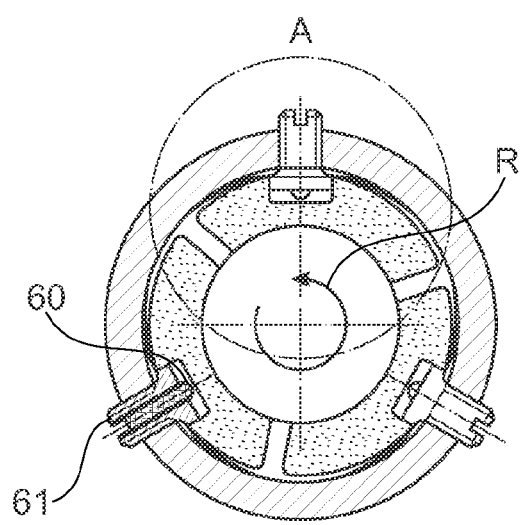

Instead it is also possible according to FIG. 6 to arrange in a threaded bore of the bolt 6 a screw-adjustable worm screw 61, which on its end facing the bearing segment 3 forms the crowned stop 60 and in principle makes possible any adjustment of this stop 60.

In all shown embodiments, the bolts 3 and the worm screws 61 respectively can be screw-adjusted from outside of the housing 1 with suitable tools. It is also possible and advantageous however in principle to arrange the bolts 3 in blind bores on the housing side and to adjust the bolts 3 respectively the worm screws 61 arranged therein using specially adapted tools which are introduced into the recess of the housing 1.

Locking the respective adjusted position can be fixed by gluing the respective interacting external and internal threads together.

The invention claimed is:

1. A gas-dynamic air bearing for radially mounting a shaft, comprising:
   a plurality of bearing segments arranged in a recess of a housing, which jointly radially enclose the shaft,
   wherein each bearing segment is held with play on the housing via a respective bolt arranged radially to a predetermined bearing axis,
   wherein each bearing segment includes an associated stop spring device supported between the housing and the bearing segments, the respective stop spring device resilient to stroke movements of the bearing segment effective radially outwardly relative to the bearing axis,
   wherein the respective bolts include a head part and a threaded shank, the threaded shank being positioned radially outwards of the head part and adjustably screwed into a corresponding bore of the housing to adjust a minimum spacing of the stop spring device from the bearing axis,
   wherein a face end of the head part of the bolt on a segment side delimits a spring travel of the stop spring device radially inwardly towards the bearing axis and positions the respective bearing segment with play in at least one of a circumferential direction and a direction of the bearing axis, and
   wherein a stop with a rounded crown is arranged on the face end of at least one of the respective bolts.

2. The air bearing according to claim 1, wherein the bearing segments between a circumference of the shaft and the respective stop spring device have a predetermined, adjustable play in a radial direction with respect to the bearing axis when the axis of the shaft coincides with the bearing axis.

3. The air bearing according to claim 2, wherein the spring travel of the respective stop spring device is exhausted radially outward in an end position of the associated bearing segment on a housing side of the bearing segment.

4. The air bearing according to claim 2, wherein the stop spring device is configured as a leaf spring, the respective leaf springs including ends supported on an inner circumference of the recess of the housing and a region near the bolt of which interacts with the respective bearing segment.

5. The air bearing according to claim 2, wherein each bearing segment includes a stroke movability radially outwardly, the respective stroke mobility being delimited, by the stop that faces the corresponding bearing segment, before the spring travel of the associated stop spring device is exhausted.

6. The air bearing according to claim 5, wherein the stop is arranged on the respective bolts, wherein at least one of the respective bolts is an adjustable screw.

7. The air bearing according to claim 1, wherein the spring travel of the respective stop spring device is exhausted radially outward in an end position of the associated bearing segment on a housing side of the bearing segment.

8. The air bearing according to claim 7, wherein the stop spring device is configured as a leaf spring, the respective leaf springs including ends supported on an inner circumference of the recess of the housing and a region near the bolt of which interacts with the respective bearing segment.

9. The air bearing according to claim 8, wherein during interaction of bearing segment and leaf spring a two-line contact is present between leaf spring and bearing segment, wherein the two contact lines in a circumferential direction of the shaft are positioned in front of and behind an axis of the bolt, respectively.

10. The air bearing according to claim 9, wherein the leaf spring includes multiple leaves.

11. The air bearing according to claim 1, wherein each bearing segment includes a stroke movability radially outwardly away from the bearing axis, the respective stroke movability being delimited, by the stop that faces the corresponding bearing segment, before the spring travel of the associated stop spring device is exhausted.

12. The air bearing according to claim 11, wherein the stop is arranged on the respective bolts, wherein at least one of the respective bolts is an adjustable screw.

13. The air bearing according to claim 11, wherein the face end of each bolt on a segment side projects into a recess on a radial outside of the respective bearing segment relative to the bearing axis, wherein the recess and the face end of the bolt have circular cross-sections.

14. The air bearing according to claim 1 wherein the stop spring device is configured as a leaf spring, the respective leaf springs including opposing ends supported on an inner circumference of the recess of the housing and a region near the bolt of which interacts with the respective bearing segment.

15. The air bearing according to claim 14, wherein during interaction of bearing segment and leaf spring a two-line contact is present between the leaf spring and the bearing segment, wherein the two contact lines in a circumferential direction of the shaft are positioned in front of and behind an axis of the bolt.

16. The air bearing according to claim 15, wherein the leaf spring includes multiple leaves.

17. The air bearing according to claim 14, wherein the leaf spring includes multiple leaves.

18. The air bearing according to claim 1, wherein the face end of each bolt on a segment side projects into a recess on a radially outside of the respective bearing segment relative to the bearing axis, wherein the recess and the end of the bolt have circular cross sections.

19. An air bearing, comprising:
   a shaft;
   a bearing housing including a circular recess and having a plurality of bearing segments arranged in the recess, wherein the bearing segments jointly enclose and mount the shaft;
   a plurality of bolts adjustably screwed to the bearing housing arranged radially to a predetermined bearing axis fixing the respective bearing segments with play relative to the bearing housing;
   a plurality of stop spring devices each associated with a respective bearing segment resilient radially relative to a central axis of the bearing housing, the respective stop spring devices supported between the bearing housing and the bearing segments, wherein the respective stop spring devices include opposing longitudinal ends tensioned against an inner circumference of the recess in the bearing housing and a middle region supporting the respective stop spring device against at least one of (i) a housing side of the bearing segment and (ii) the bolt associated with the respective bearing segment;
   wherein the respective bolts include a head part and a threaded shank, the threaded shank being positioned radially outwards of the head part, the head part projecting into a recess disposed on the housing side of the bearing segment, the head part delimiting a spring travel of the associated stop spring device radially in a direction towards the bearing axis and positions the respective bearing segment in the bearing housing in at least one of a circumferential direction and a direction of the bearing axis; and
   wherein each bearing segment includes a stroke movability radially in a direction away from the bearing axis, the stroke movability of at least one bearing segment being delimited by a stop arranged in the recess of the at least one bearing segment before the spring travel of the associated stop spring device is exhausted, the stop including a rounded crown arranged on a face end of at least one of the respective bolts.

20. The air bearing according to claim 19, wherein the stop spring devices are configured as leaf springs having multiple leaves, the respective leaf springs including opposing ends supported on the inner circumference of the recess of the bearing housing and a region near the bolt which interacts with the respective bearing segment.

\* \* \* \* \*

UNITED STATES PATENT AND TRADEMARK OFFICE
CERTIFICATE OF CORRECTION

PATENT NO. : 9,581,169 B2
APPLICATION NO. : 14/542104
DATED : February 28, 2017
INVENTOR(S) : Michal Klusacek It is certified that error appears in the above-identified patent and that said Letters Patent is hereby corrected as shown below:

On the Title Page

Item [72] Inventor, the city is incorrectly spelled as "PRAGUE" and should be deleted.
The correct spelling of the city should read "PRAHA".

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*